United States Patent [19]
Law et al.

[11] Patent Number: 5,999,881
[45] Date of Patent: Dec. 7, 1999

[54] AUTOMATED PATH PLANNING

[75] Inventors: Christopher Charles Law, Charlton; William John Schroeder, Schenectady, both of N.Y.; Hsuan Chang, Dublin, Ohio

[73] Assignee: General Electric Company, Schenectady, N.Y.

[21] Appl. No.: 08/851,393

[22] Filed: May 5, 1997

[51] Int. Cl.[6] .................... G06F 165/00; G01C 21/00
[52] U.S. Cl. ............... 701/301; 701/26; 701/201
[58] Field of Search ............... 701/301, 25, 26, 701/201

[56] References Cited

U.S. PATENT DOCUMENTS

| | | | |
|---|---|---|---|
| 5,083,256 | 1/1992 | Trovato et al. | 364/148 |
| 5,347,459 | 9/1994 | Greenspan et al. | 364/461 |
| 5,502,638 | 3/1996 | Takenaka | 364/424.02 |
| 5,675,720 | 10/1997 | Sato et al. | 395/119 |

OTHER PUBLICATIONS

T. Lozano–Perez and M.A. Wesley, "An Algorithm for Planning Collision–Free Paths Among Polyhedral Objects", Comm. of the ACM 22 (10):560–570, Oct. 1979.

J. Barraquand, B. Langlois and J.C. Latombe, "Numerical Potential Field Techniques For Robot Path Planning", IEEE Transactions on Systems, Man, and Cybernetics, 22(2):224–241, 1992.

L. Kavraki, "Randomized Preprocessing of Configuration Space for Fast Path Planning", IEEE Intl. Conf. on Robotics and Automation, 1994.

*Primary Examiner*—Michael J. Zanelli
*Attorney, Agent, or Firm*—Jean K. Testa; Donald S. Ingraham

[57] ABSTRACT

This present invention makes use of a method for automatically finds collision-free part removal paths. The system sparsely samples the high-dimensional state space and maps the rest of the space using proximity assumptions (assumptions about states near the samples). The present invention is less complex and faster than previously known methods.

13 Claims, 4 Drawing Sheets

FIG. 3A
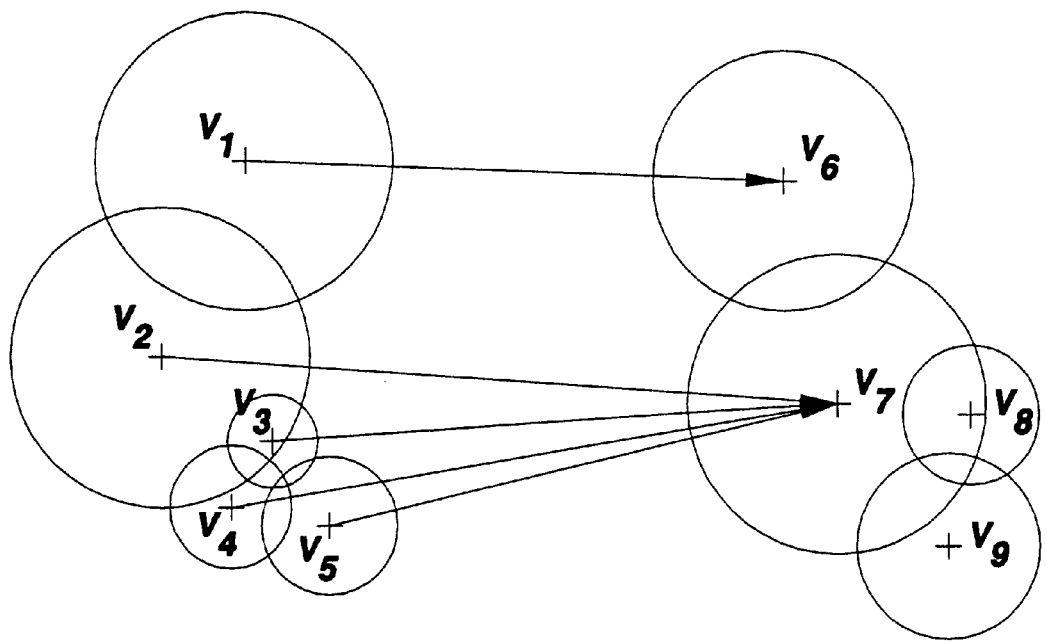
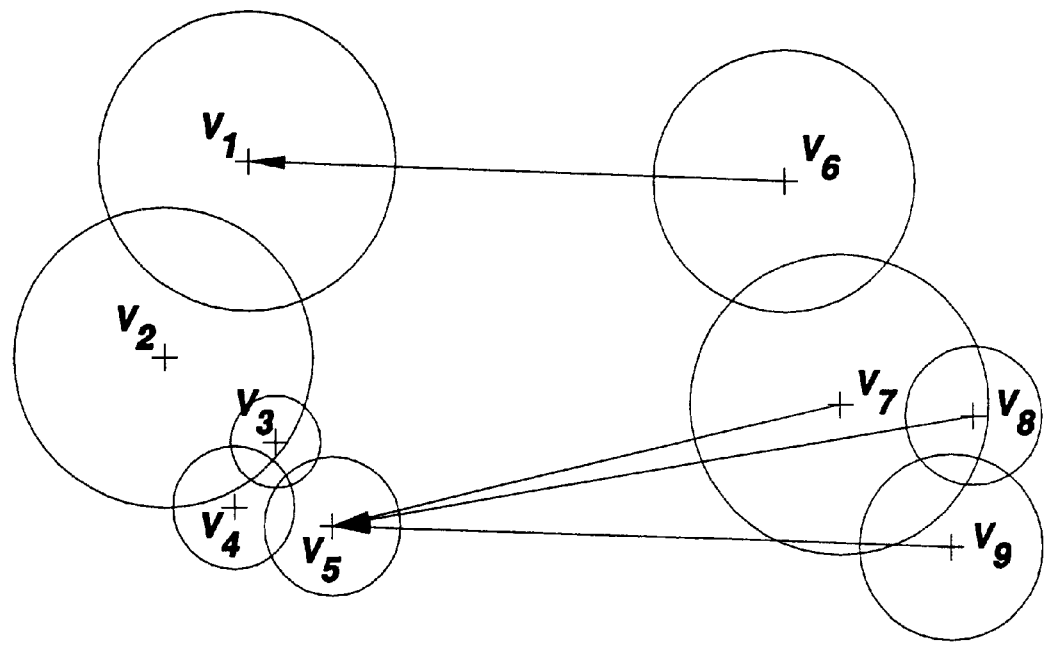
FIG. 3B

AUTOMATED PATH PLANNING

BACKGROUND OF THE INVENTION

1. Scope of the Invention

The present invention relates to computer calculation of an object's path through space which does not collide with other objects.

2. Related Prior Art

When designing products using computer aided techniques, it can be important to know whether the resulting product can be assembled and maintained easily. Since it is expensive and slow to build physical mock ups, there are significant advantages to simulating these physical systems and automatically determining if parts can be removed as expected. The problem of generating a path that does not cause the moving object to touch any other components has been call the "find path" problem described in T. Lozano-Perez and M. A. Wesley, "An Algorithm For Planning Collision-Free Paths Among Polyhedral Objects" *Comm. of the ACM* 22(10):560–570, October 1979.

Unfortunately, automatically generating paths is a non-trivial problem especially for trajectories with close tolerances or systems with many degrees of freedom. Testing for collisions between the moving object and structures in the workspace can be computationally expensive, and searching multi-dimensional spaces requires many collision checks.

The work space defines the space in which the moving object and the structures interact and the state space of the system represents all the possible states the moving object can obtain in the workspace. Although the work space of the system usually has only three dimensions, state space of the moving object can have six dimensions or more. For example, in a three dimensional work space a rigid moving part has six degrees of freedom: three to position the center of the object, and three to determine its orientation around its midpoint. Objects with joints or actuators, such as robotic arms, can have even more degrees of freedom.

A randomized path planner (RPP) method, as described in J. Barraquand, B. Langlois and J. C. Latombe, "Numerical Potential Field Techniques For Robot Path Planning" *IEEE Transactions on Systems, Man, and Cybernetics*, 22(2) :224–241, 1992 has been a successful algorithm in solving find path problems. Its defines a state-space energy function which guides the moving object from the start to the end state using gradient descent.

RPP generates a state-space energy function by first creating a work-space energy function which can guide a point from the starting position to the ending position in the workspace. One or more guide points are chosen on the moving object to define the state-space function in terms of the work-space function. For any state of the moving object the state-space function is simply a weighted sum of the work-space function evaluated at the these guide points.

Unfortunately, the state-space function has local minima which trap the gradient descent algorithm before the moving object reaches the end state. In this situation RPP uses a random walk to escape the local minimum. This random walk is the bottle neck of the algorithm which spends most of its time escaping local minima.

A road map planner (RMP), described in L. Kavraki, "Randomized Preprocessing of Configuration Space for Fast Path Planning" *IEEE Intl. Conf on Robotics and Automation*, 1994, has recently been proposed as a successor to the RPP algorithm. It maps free space by testing individual states and the links which connect these states. The result is a net work, compared to highway system, which lies entirely inside of valid state space. The problem is then reduced to finding a path from the starting position to the network, and from the network to the goal.

Theoretically, this algorithm has advantages over RPP, but has not performed well in some test cases where local connections (or links) between two states are computationally expensive to establish. An interesting fact is that 80% of the search time was spent verifying a continuous connection of links throughout the network. Verifying continuity of the links is a computationally-expensive operation because a large number of collision checks may need to be performed along the link.

Currently there is a need for a system which efficiently calculates an automated path of a known object through space without colliding with other known objects.

SUMMARY OF THE INVENTION

An auto path planning system automatically determines a path from a start state, being a start point on a state diagram, to an end state, between an end point on a state diagram, avoiding collisions with obstacles. The present invention operates on objects in multi-dimensional space. For example, an object may be described by a three dimensional location and a rotation about three axes for six dimensional space.

First, the obstacle descriptions are acquired.

A region of a predetermined maximum radius R in state space around the start state is created, and a destination region is also created using destination point as the center with the radius R of each region selected to overlap the other region.

A path connecting the start and destination states, being totally contained within the overlapping regions is tested to determine if it collides with an obstacle.

If no obstacles are encountered, then center points of regions previously stored in a valid list are connected to result in the automatically calculated path, and the system is finished.

If an obstacle is encountered, the collision point where an obstacle intersects the region is determined.

The size of the current region and neighbor regions is reduced to a radius being slightly less than the distance between its center to a closest collision point.

The current region is added to the valid space list.

The collision point is added to a hit list.

The regions stored up until this point in the valid space list are adjusted to a radius being slightly less than the distance between its center to a closest hit point.

An existing region from the valid space list is then chosen as a parent region from which to spawn a child region.

A candidate point within parent region is chosen as a center point of a child region.

If the candidate point hits an obstacle, then the radii of the regions are appropriately adjusted, and the hit list and valid space list are adjusted. Another candidate point or parent region is then chosen and the process is continued as set forth above.

If the candidate point does not hit an obstacle, then a child region is created with the candidate point as its center point, having a radius being less than the closest collision location in hit list.

Then repeating the steps above from where a connecting path is chosen.

Keep making new child regions if the start and destination regions are not in the same network.

When the start and destination states are in the same network, connecting valid stored center points of the path of the last processed region to result in said automatically calculated path.

OBJECTS OF THE INVENTION

An object of the present invention is to automatically calculate a path through space which a known object may move without colliding with other known objects.

Another object of the present invention is to automatically and efficiently calculate a state path between a starting state and a destination state of a known part, providing the proper clearance, which the part may be added to, or removed from, another structure, without being blocked by the structure.

BRIEF DESCRIPTION OF THE DRAWINGS

The features of the invention believed to be novel are set forth with particularity in the appended claims. The invention itself, however, both as to organization and method of operation, together with further objects and advantages thereof, may be best understood by reference to the following description taken in conjunction with the accompanying drawings in which:

FIGS. 3a, 3b illustrates how local minima of a gap function are calculated according to the present invention.

DETAILED DESCRIPTION OF THE INVENTION

The present invention defines collision space as the set of states which cause a moving object to collide with a structure, and valid space is the set of all non-colliding states. With these definitions, the objective of the auto path planning system of the present invention, is to find a path in state space, which connects the start and end states, and lies entirely within valid space.

The proposed path planner looks for paths in a similar manner to the RMP method mentioned above, but avoids having to verify continuity for a large number of links. The present invention assumes that two states can be linked if they are close, and does not check that assumption until a prospective path from start state to destination state has been found.

Approximating Valid Space

As mentioned before, an object moving through space not only has a three-dimensional location of its center point, but also has additional dimensions such as $\alpha$, $\theta$ and $\gamma$ for rotation about three-dimensional Cartesian axes. There may be additional dimensions, however, for simplicity, this specification will use six dimensions for its discussion, even though it is understood that additional dimensions may be used equally well with the present invention.

A volume, or 'region', is simply a set of all states (or points in state space) within a given distance, referred to as a 'radius' of a 'center point' of the region. Different distance functions may be used, such as a Euclidean Distance function, which is simply a geometric distance measurement, or a Manhattan Distance function, which measures distances along a path constrained to be along a regular grid, like Manhattan city streets.

All states contained in volumes are initially assumed to be valid, while all other states are initially assumed to cause collisions. If the map assumptions are true, then a path connecting the centers of two overlapping (neighboring) volumes is a non-collision, or valid path. It is also assumed that at least one valid path exists between any two points within a network of contiguous volumes.

Searching Valid Space

Figure 1:
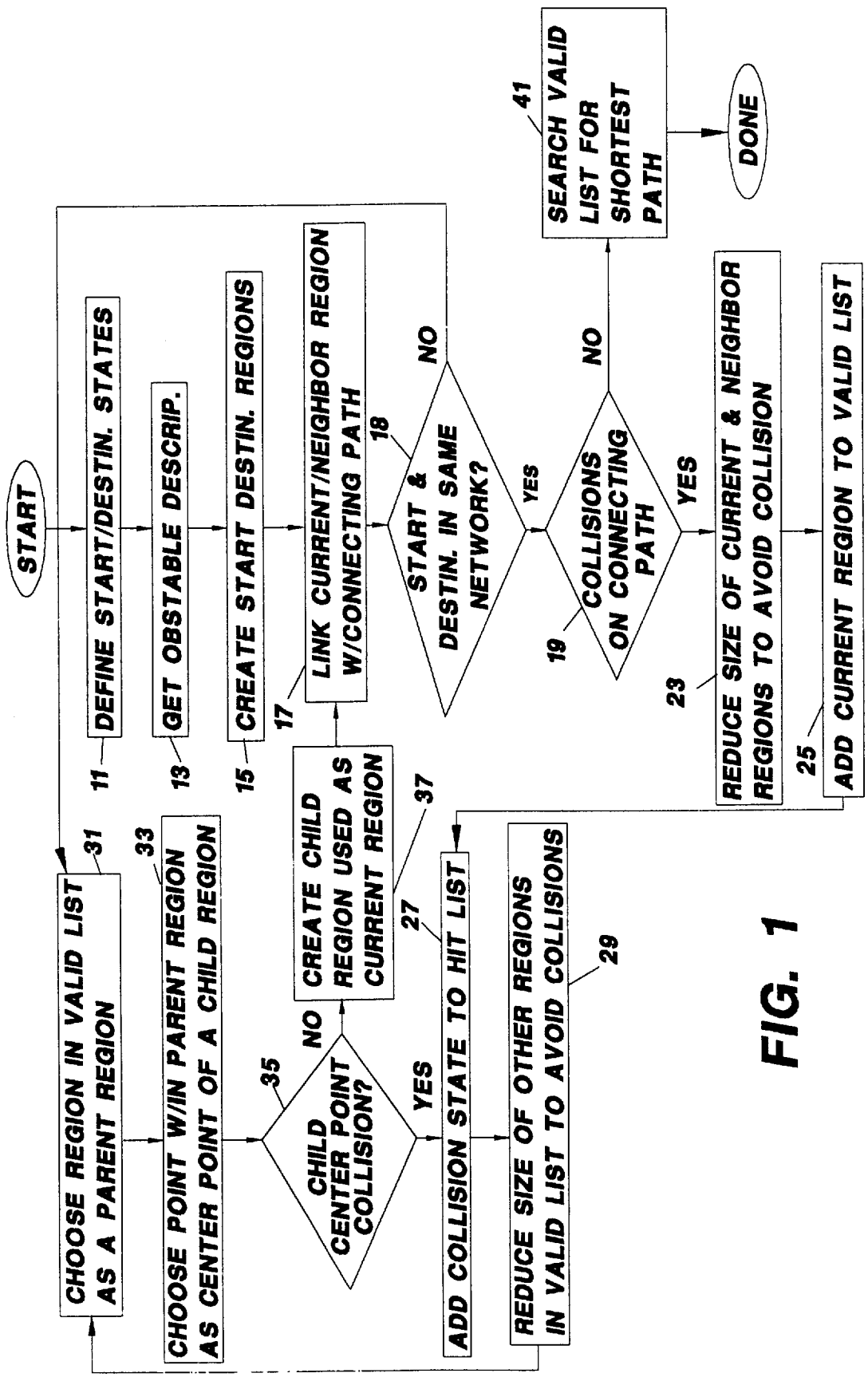
FIG. 1 is a simplified flow diagram of the major steps performed by the auto path planning device according to the present invention.

Perhaps the best way to describe the functioning of the present invention is to walk through a flowchart of the method as shown in FIG. 1 described in connection with FIG. 2, which shows regions produced by the present invention in creating a path from a start point to a destination point on a two dimensional state diagram. In Step 11, the start and destination states are defined, or are prestored. Using a state diagram, each unique state is represented by a point.

In Step 13 of FIG. 1, a description of existing obstacles is provided by the present invention. Alternatively, these may be prestored. The obstacle typically is defined by a collision function in which the state is provided to the function and an outcome of the function is that there is or is not a collision. In FIG. 2, two obstacles 2 and 4 are shown between the start and destination points.

In step 15, the start and destination points are used as the center of a region defined as all points less than a given distance from the center. Since there are no collisions yet, the radius for the start and destination regions can be any number but more realistically is set to some maximum radius value. This maximum radius value is chosen to be large enough such that the start and destination regions overlap one another. Overlapping regions are defined as "neighbor" regions.

Figure 2:
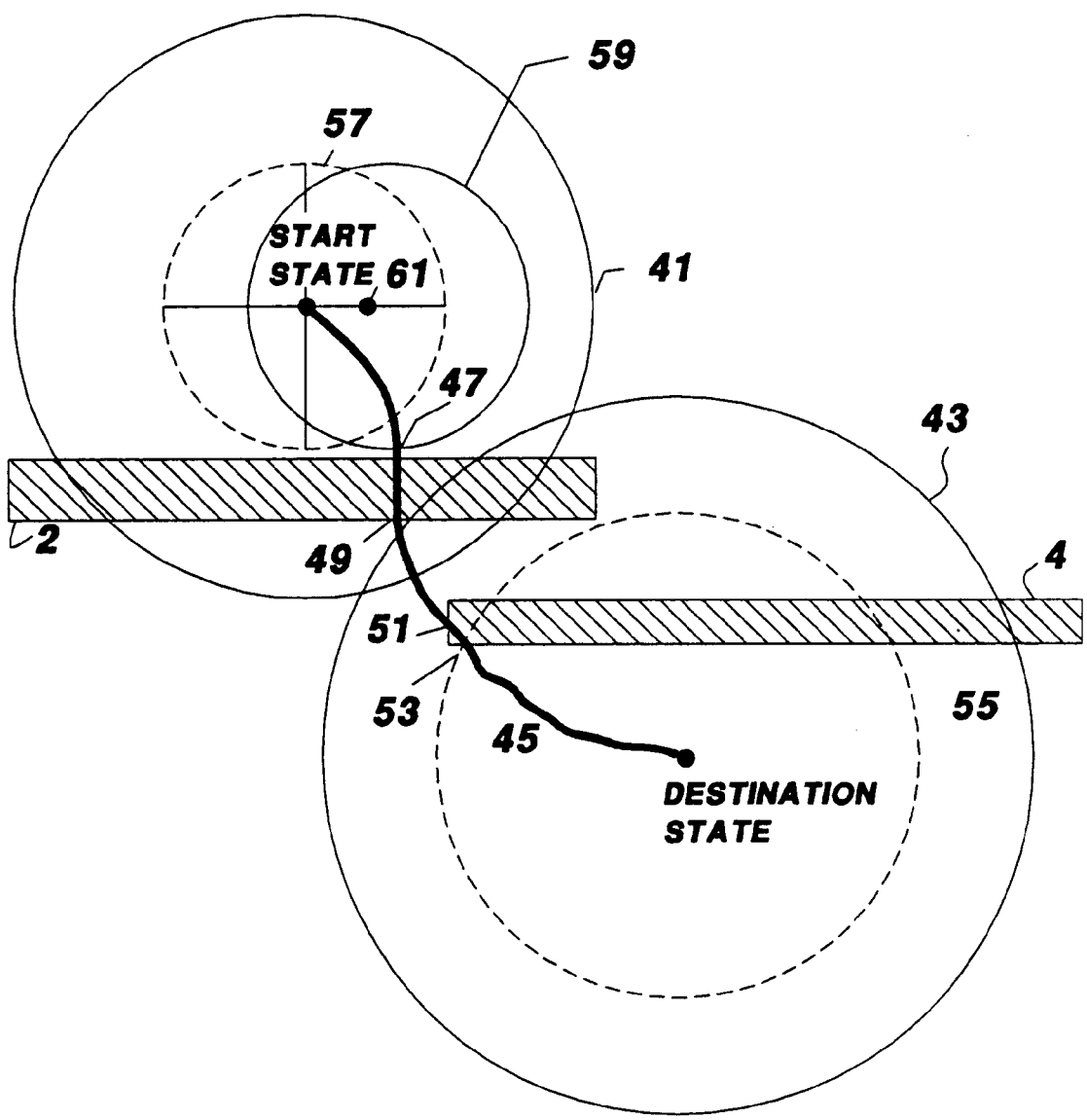
FIG. 2 illustrates region of state spaced searched by the present invention in creating a path from a start point to a destination point on a two dimensional state diagram.

In Step 17, a connecting path links the centers of neighbor regions in FIG. 2 being start region 41 and destination region 43. Connecting path 45 may be any path which is entirely within the neighbor regions.

In Step 18, a determination is made if the start and destination regions are in the same network. When start and destination points are in the same network, then Step 19 is performed, to determine if there are any collision on the connecting path between the current region (start region 41) and the neighbor region (destination region 43) on connecting path 45. Any number of methods may be used to determine if a collision is encountered, such as checking a mid-point of line 45 and further breaking the segments between the mid-point and ends into smaller segments and checking them for collisions, and repeating this until a desired accuracy is accomplished. Any points between and including points 47 and 49 or between and including points 51 and 53 will result in a collision.

If a collision has occurred, Step 23 is performed to reduce the size of neighbor regions to avoid the collision. Therefore, destination region 43 is reduced to the dotted line 55 and start region 41 is reduced to dotted perimeter 57. (This assumes that the collision found was 47 for the start region and 53 for the destination region). The start region and end region with its reduced perimeters with their reduced perimeters are then added to a valid list, which is a list which contains the center points of regions which do not currently include any collision points, their radii and a list of neighboring regions.

In Step 27, the collision state is added to a hit list, being a list of collision points.

In Step 29, any other regions in the valid list are adjusted in order to avoid the new collision points found. Processing continues at step 31.

In step 18, If the start and destination points are not in the same network, processing also continues at Step 31 starting with a new parent region and spawning new child regions.

Step 31 is performed to choose a region in a valid list as a parent region. This parent region will spawn child regions which will tunnel their way through space eventually meeting up with the destination region.

In Step 33, a point within the selected parent region is chosen as the center point of a child region. For example, if reduced region 57 is chosen as the parent region, a center point 61 may be chosen within region 57 to be the center point about which a child region 59 is created. Child region 59 has a radius which may be up to, but not including, any known collision points. Therefore, child region 59 does not encompass collision point 47. Regions 57 and 59 are part of a network and are neighbor regions. Similarly, any regions which are attached to and overlap these regions are also part of the network.

In Step 35, the center point 61 of child region 59 is tested to determine if it is in collision with an obstacle, and if not, the child region is created in Step 37.

This processing continues until the start and destination regions are in the same network as determined in step 18, and in step 19, there are no collisions on the connecting path.

Then, in Step 41, the regions stored in the valid list at that point, are searched for the shortest path between the start and destination points. This path is the automated planned path that is desired and processing is finished.

In one embodiment, the possible states in the parent volume, which can be chosen to produce a new child volume, may be limited to a small set of candidates. For example, all candidate center points may be restricted to lie on an axes of the parent volume, and at a fixed ratio from the center to the parents surface. In a six dimensional state space, this would result in each volume having up to twelve children, two for each axis.

A possible additional requirement, would be to use only points which are not covered by any neighboring volume as a candidate center point. This minimizes overlapping volumes, and creates a more efficient mapping of state space.

Rating Volumes

The method of rating volumes to choose a parent volume is critical for the success of the planner. Growing the volumes in an intelligent manner produces an efficient search of the state space, and greatly reduces the time necessary to find a valid path.

Several different heuristics for rating the volumes may be used. The simplest just fills space as fast as possible. The region, with the largest non-overlapping or uncovered, surface area is chosen to spawn a new volume. The uncovered surface area may be estimated by multiplying the number of candidate child states with the radius of the parent region.

Choosing the volume with the largest uncovered surface area produces a brute force depth-first search of valid space. The function is not used alone because it does not work well in high-dimensional spaces.

A second embodiment is referred to as pioneering, and gives the highest ratings to region with the fewest number of neighbors. This produces a fast sparse search of the state space and is useful at the beginning of the search to explore a complicated state space quickly. This method is also useful in finding paths where back tracking is required.

A third embodiment bridges small gaps between non-contiguous networks. For any volume, a nearest non-contiguous region is selected as the parent region. This works well when the algorithm is close to finding a path, but can misdirect the search when two networks are separated by a thin impenetrable barrier.

A fourth embodiment makes use of local minima of a gap between non-contiguous regions, in rating parent volumes.

In FIGS. 3a, 3b, several regions, or volumes, of a start network, v1, v2, v3, v4, v5 are shown. Also shown are several volumes of an end network, v6, v7, v8, v9. In FIG. 3a, regions of the start network are checked to determine their closest non-contiguous volume. For v1, it is v6. For volumes v2, v3, v4, v5, it is v7.

In FIG. 3b, regions of the end network are checked to determine their closest non-contiguous volume. For volume v6 it is v1. For volumes v7, v8, v9, it is v5. The volume pairs (v1, v6) and (v5, v7) are considered local minima because they are reciprocal nearest non-contiguous volumes.

Regions close to a local minimum are rated high and are preferentially chosen as parents. This strategy produces a directed search and will bridge a gap between networks even when they are separated by a relatively large distance.

The efficiencies of these search methods depends heavily on the obstacles and conditions of the search as well as how much space has already been explored. The present invention may use one, several, or all of these methods in selecting parent volumes. This allows the strategies to boot strap and work more efficiently and more generally than any one strategy alone.

Choosing A Child Candidate

Additional efficiency can be added to the search by intelligently choosing which candidate of a parent should produce a child. A pioneering strategy chooses the candidate child center point which is furthest from the parent's neighbors. Analogous strategies exist for selecting a candidate child region center point.

Pruning The Collision Set

The overhead of creating a volume gets large as the collision set grows, so for long searches it is useful to periodically prune the collision set of unnecessary elements. Every time a new child region is created the distance to every member of the collision set is computed in order to determine the radius of the region.

Collision states, which are close to the boundary of collision and valid space, provide the most information because they are the most likely to constrain existing as well as future volumes. Collision states which do not constrain any volumes are assumed to be deep in collision space and are removed from the set.

Guide Path

Often the designer of the system has a specific path in mind, and can provide useful information which can drastically reduce the time necessary to find a valid path. For this reason a user may define a guide path which can focus the search of state space. In the simplest case the guide path is just the segment which connects the start and the end state, but can optionally have many linked sample states.

The guide path focuses the search by manipulating the rating functions. The further the center of a volume is from the guide path, the lower its rating and the less likely it will be chosen to produce a child. This is implemented by scaling a rating function by a function, whose standard deviation is a search parameter which is determined by the designers confidence in the guide path.

The nodes of the guide path also provide a good set of initial volumes for mapping the search space. This additional information allows the directed search strategies to connect separate networks, and decrease the time necessary to find a valid path.

In another alternative embodiment, each link of the guide path can be considered a separate 'find path' problem to be solved in series. This allows the present invention to start with a clean slate after finding a path to the next link of the guide path. Although some useful information can be lost when the algorithm starts over, the memory and computational overhead of maintaining the map in irrelevant state space is eliminated. The biggest drawback to this serial approach is that it requires the final path to exactly pass though all the nodes of a guide path. If a guide path is poorly specified, this will hinder the search.

Searching Networks Independently

Since it is easier for the algorithm to find its way out of tight spaces than into tight spaces, it is beneficial to preferentially search networks comprised of small regions. Unfortunately, these are exactly the regions that are rated low by the above mentioned search strategies that choose parent regions. To solve this dilemma, the networks are searched independently so no one network predominates. Currently, each network is searched for a fixed fraction of time. It may also be useful to preferentially search networks based on additional properties such as the largest volume in a network, or whether the network contains a guide path node.

Figure 4:
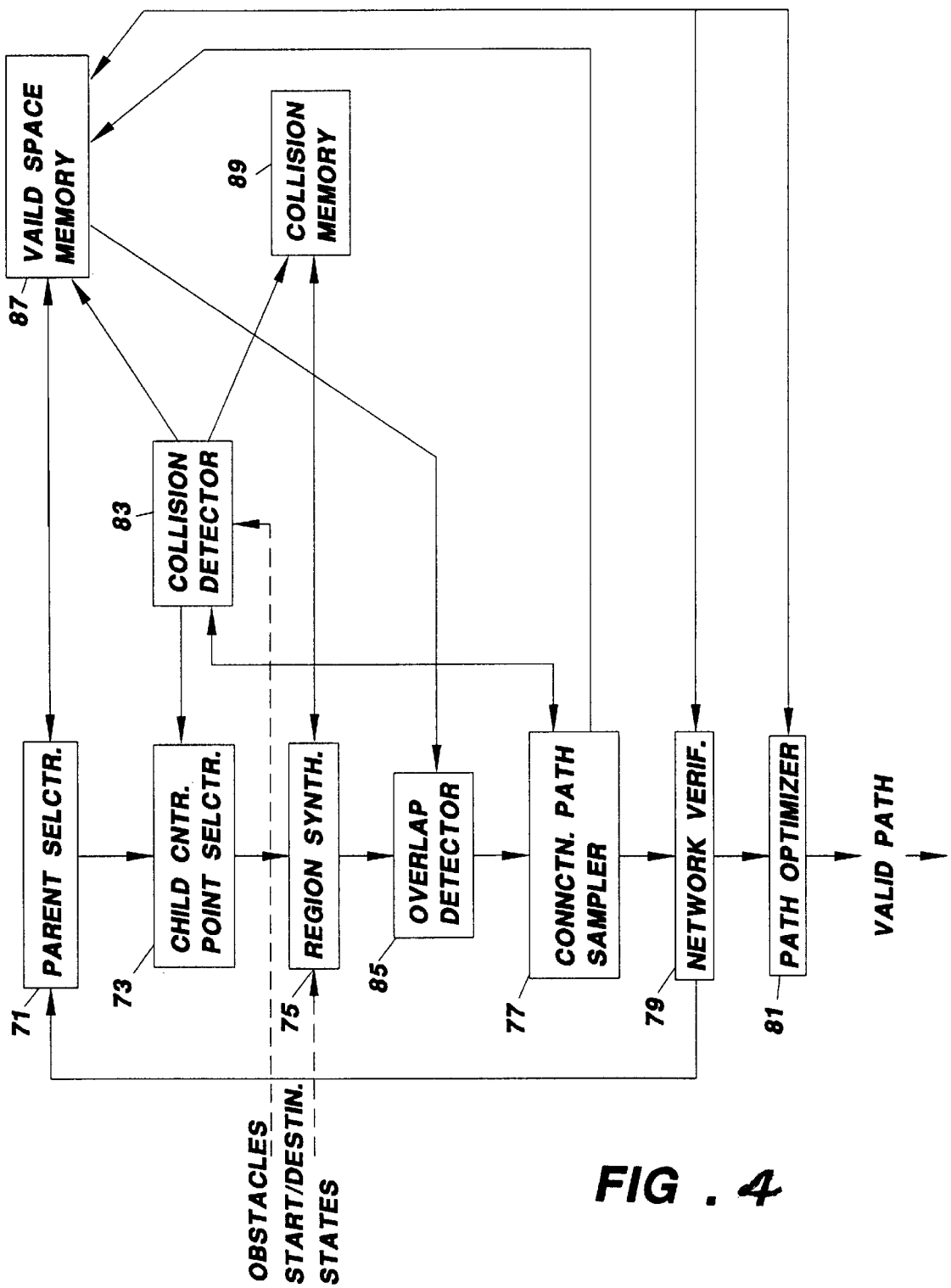
FIG. 4 is a simplified block diagram of an automated path planner apparatus according to the present invention.

FIG. 4 shows a simplified block diagram of an apparatus compatible with the present invention. Each of the blocks represents an element which performs a function. This may be implemented as a dedicated circuit performing the function, a microprocessor performing a subroutine which ultimately performs the function, or a general purpose computer implementing different functional subroutines of a larger program. In FIG. 4, the initial parameters such as the start and destination states and the definition of the obstacles are provided to a region synthesis device 75, and a collision detector 83, respectively. Collision detector 83 may also have the definitions of the obstacles preset or prestored.

Region synthesis device 75 looks through collision memory 89 to determine the closest collision point and defines two regions, one surrounding the start state, and one surrounding the destination state, initially, and later a current region around a child center points it receives from a child center point selector device 73.

Region synthesis device 75 also has a predetermined maximum radius in the event that there are no collisions in collision memory 89.

Region synthesis device provides the region information to an overlap detector device 85 which checks through a valid space memory 87 for other regions, called 'neighbor regions', which overlap the current region. Overlap detector provides the neighbor region information to a connection path sampler 77.

In the event that there is at least one neighbor region, connection path sampler makes a connecting path between the current and neighbor regions and samples that path to provide points which are fed to a collision detector unit 83.

Collision detector 83 then determines if a collision occurs at the point provided to it. In the event there is a collision then collision detector 83 adjusts the size of current and neighbor regions, and also those regions stored in valid space memory 87. It also stores the collision point in collision memory 89.

In the event there is no neighbor region to the current region, or a collision along the connection path, a parent selector 71 is activated which searches through valid space memory to select an appropriate region to be the parent of the child region. The chosen parent region is passed to a child center point selector 73.

Child center point selector 73 selects a child center point within the parent region and passes this information to collision detector 83 which indicates if there has been a collision. In the event that the center point chosen is inside an obstacle, center point selector 73 selects another point until one is selected that is not within an obstacle. For each point which is in an obstacle collision detector 83 updates valid space memory and collision memory appropriately. The center point is then passed to region synthesis device 75 and processing continues as before.

In the event that the connection path sampler 77 does not find a collision, connection path sampler 77 then updates valid space memory with a new valid region.

Once a connection path is found which does not contain collisions, then a network verification unit 79 is activated and makes a path through the last centerpoint added to valid space memory 67, and centerpoints previously stored in valid space memory 87 and determines if the start point is in the same network as the end point.

If they are in different networks, then parent selector 71 is activated and new parent and child regions are selected and tested. The apparatus functions in this manner until network verification unit 79 determines that the start and destination points are in the same network.

At this point, a path optimizer 81 walks through stored points in valid space memory 87 to determine the shortest path between the start and destination points which is entirely within valid space. This result is then the valid path linking the start and destination states, lying entirely within valid space.

While several preferred embodiments of the novel invention has been described in detail herein, many modifications and variations will now become apparent to those skilled in the art. It is, therefore, to be understood that the appended claims are intended to cover all such modifications and variations as fall within the true spirit of the invention.

What is claimed is:

1. An auto path planning method for automatically determining a path from a start state, said start state being a start point on a state diagram, to an end state, said end state being an end point on a state diagram, said planning method comprising the steps of:

a) acquiring descriptions of a plurality of obstacle locations;

b) creating a first start region about said start point, said start point being the center point of said first start region, said first start region having a start radius of predetermined value;

c) creating a first destination region about said end point, said end point being the center point of said first destination region, said first destination region having a destination radius selected such that said first destination region and said first start region overlap in part;

d) creating a first connecting path for connecting said start point and said end point;

e) testing said first connecting path to determine if said first connecting path intersects with any of said plurality of obstacle locations, each intersection of said first connecting path with any of said plurality of obstacle locations defining a collision point set;

f) adding said first start region, said first destination region, said start point and said end point to a valid space list if said first connecting path does not intersect with any of said plurality of obstacle locations, said first connecting path providing the automatically determined path;

g) creating a second start region if said first connecting path intersects with any of said plurality of obstacle locations, said second start region being created by reducing said start radius of said first start region to be less than a distance from said start point to the intersection disposed closest to said start point, said reduced start radius and said start point defining said second start region;

h) creating a second destination region if said first connecting path intersects with any of said plurality of obstacle locations, said second destination region being created by reducing said destination radius of said first destination region to be less than a distance from said end point of said first destination region to the intersection with said obstacle locations disposed closest to said end point, said reduced destination radius and said end point defining said second destination region;

i) adding said second start region, said second destination region, said start point and said end point to a valid space list;

j) adding said collision point set to a hit list;

k) determining if said second start region and said second destination region overlap in part, said first connecting path providing the automatically determined path if said second start region and said second destination region overlap in part;

l) if said second start region and said second destination region do not overlap in part, choosing a region from said valid space list, said chosen region being disposed between said second start region and said second destination region, said chosen region defining a parent region from which to spawn a plurality of child regions;

m) choosing a candidate point within said parent region as a center point of a first child region;

n) creating said plurality of child regions, each of said plurality of child regions being created to overlap in part with a previously created child region;

o) creating a second connecting path for connecting said respective center points of said plurality of child regions such that said second connecting path does not intersect with any of said plurality of obstacle locations; and, p) repeating steps n and o until said second start region and said second destination region are linked by said plurality of child regions that overlap in part, said second connecting path providing the automatically determined path.

2. The auto path planning method of claim 1 where the step of choosing a region from the valid space list comprises the step of:

choosing the region with the largest uncovered surface area, as the parent region.

3. The auto path planning method of claim 1 where the step of choosing a region from the valid space list comprises the step of:

choosing the region with the fewest number of neighbors, as the parent region.

4. The auto path planning method of claim 1 where the step of choosing a region from the valid space list comprises the step of:

choosing the region with the nearest non-contiguous region, as the parent region.

5. The auto path planning method of claim 1 where the step of choosing a region from the valid space list comprises the step of:

choosing the region closest to a local gap function minimum, as the parent region.

6. The auto path planning method of claim 1 where the step of choosing a region from the valid space list comprises the step of:

choosing the region closest to a user-defined guide path, as the parent region.

7. The auto path planning method of claim 1 where the step of choosing a candidate point of parent region comprises the step of:

choosing a point within the parent region, being furthest from neighbors of the parent region, as the candidate point.

8. The auto path planning method of claim 1 where the step of choosing a candidate point of parent region comprises the step of:

choosing a point within the parent region, being closest to a nearest region which is not contiguous with the parent region, as the candidate point.

9. The auto path planning method of claim 1 where the step of choosing a candidate point of parent region comprises the step of:

choosing a point within the parent region, being closest to a local gap function minimum, as the candidate point.

10. The auto path planning method of claim 1 where the step of choosing a candidate point of parent region comprises the step of:

choosing a point within the parent region, being closest to a user-defined guide path, as the candidate point.

11. The auto path planning method of claim 1 wherein the step of choosing a candidate point within parent region comprises the step of:

choosing an point within parent region on one the axes of the parent region a predefined distance from the center of the parent region which has not been previously chosen, as a center point of a child region.

12. An auto path planning system for automatically determining a path from a start state, being a start point on a state diagram, to an end state, being an end point on a state diagram, comprising:

a) a valid space memory for storing a plurality of regions, respective center locations of said regions and respective radii of said regions;

b) a collision memory for storing a plurality of collision locations;

c) a region synthesis device coupled to the collision memory for creating the plurality of regions between a first region and a second region, the first region having the start point as the center location of the first region, the respective radius of the first region being less than the distance from the start point to the collision location disposed closest to the start point, the second region having the end point as the center location of the second region, the respective radius of the second region being less than the distance from the end point to the collision location disposed closest to the end point, the region synthesis device receiving respective center locations for creating the regions between the first and second regions;

d) an overlap detector coupled to the region synthesis device and the valid space memory, for detecting if any of the plurality of regions overlap with other regions, said overlapping regions defining a same network;

e) a connection path sampler coupled to the overlap detector for creating a connecting path linking the respective center locations of overlapping regions and for sampling the connecting path to provide sample points, the connection path sampler updating the valid space memory with the overlapping regions;

f) a collision detector coupled to the collision memory and the connection path sampler for receiving the sample points and for determining if the sample points indicate a collision, the collision detector reducing the regions stored in the valid space memory if a collision is indicated by reducing the respective radii of the regions to be less than the distance between the respective center locations of the regions to the collision location disposed closest to the respective center locations, and said collision detector adding new collisions to collision memory when a collision is indicated;

g) a parent selector, coupled to the valid space memory, for choosing a region from the plurality of regions stored in the valid space memory to define a parent region from which to spawn a plurality of child regions by the region synthesis device;

h) a child center point selector, coupled to the parent selector and the collision detector, for choosing a candidate point within the parent region as the respective center location of the child region, the candidate point being not contained within collision memory and defining the respective center location of the child region;

i) a path optimizer coupled to the valid space memory for finding a shortest path linking the start point and the end point, the shortest path being contained within the valid space memory, the shortest path to result in the automatically determined path; and j) a network verification device for determining if the first and second regions are in the same network, the network verification device activating the path optimizer if the first and second regions are in the same network, and the network verification device activating the parent selector if first and second regions are not in the same network.

13. The auto path planning method of claim 1 where the step of creating a plurality of child regions comprises the steps of:

defining said plurality of child regions by respective center points and respective radii; and, selecting said respective radii such that each of said plurality of child regions does not include points in said collision point set.

* * * * *